United States Patent
Bui et al.

(10) Patent No.: US 7,364,106 B2
(45) Date of Patent: Apr. 29, 2008

(54) COMPENSATION FOR TAPE BREAKAGE IN A TAPE DRIVE

(75) Inventors: Nhan Xuan Bui, Tucson, AZ (US); Junichi Fukuda, Sagamihara (JP); Randy Clark Inch, Tucson, AZ (US); Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/674,615

(22) Filed: Feb. 13, 2007

(65) Prior Publication Data

US 2007/0187540 A1    Aug. 16, 2007

Related U.S. Application Data

(62) Division of application No. 10/765,789, filed on Jan. 26, 2004, now Pat. No. 7,175,122.

(51) Int. Cl.
*G11B 15/18* (2006.01)

(52) U.S. Cl. ............... 242/333.1; 242/333.5; 242/333.6; 360/74.2

(58) Field of Classification Search ............ 242/333.1, 242/333.5, 333.6, 333.7; 360/74.1, 74.2
See application file for complete search history.

(56) References Cited

U.S. PATENT DOCUMENTS

| 3,732,477 | A | 5/1973 | Ciccatelli |
|---|---|---|---|
| 4,341,364 | A | 7/1982 | Maddaloni |
| 5,600,504 | A | 2/1997 | Seo |
| 5,808,824 | A | 9/1998 | Kaniwa et al. |
| 6,188,536 | B1 | 2/2001 | Chliwnyi |
| 2003/0016465 | A1 | 1/2003 | Bui et al. |

FOREIGN PATENT DOCUMENTS

| JP | 63-191343 A | 8/1988 |
|---|---|---|
| JP | 04-076845 | 3/1992 |
| JP | 52-145209 | 12/1997 |

OTHER PUBLICATIONS

U.S. Appl. No. 10/223,967, filed Aug. 20, 2002, Bui et al.

*Primary Examiner*—John Q. Nguyen

(57) ABSTRACT

Disclosed are a system, a method, and an article of manufacture to provide for the detection and compensation of tape breakage in a tape drive. The invention operates by simultaneously monitoring the tape reel rotation direction and the ratio of rotation between the tape reels. If the rotation direction is not the same for both reels, then tape breakage is indicated and reel rotation ceases. Tape breakage is also detected if the tape reel angular rotation ratio between the supply and take up reels is not within a specified tape reel ratio range. The tape reel angular rotation ratio is detected by simultaneously measuring the angular rotation of each tape reel in a specified time period and then calculating the ratio. The present invention detects the tape reel angular rotation ratio and if tape reel angular rotation ratio is outside of the specified tape reel ratio range, tape breakage is indicated and reel rotation ceases.

5 Claims, 8 Drawing Sheets

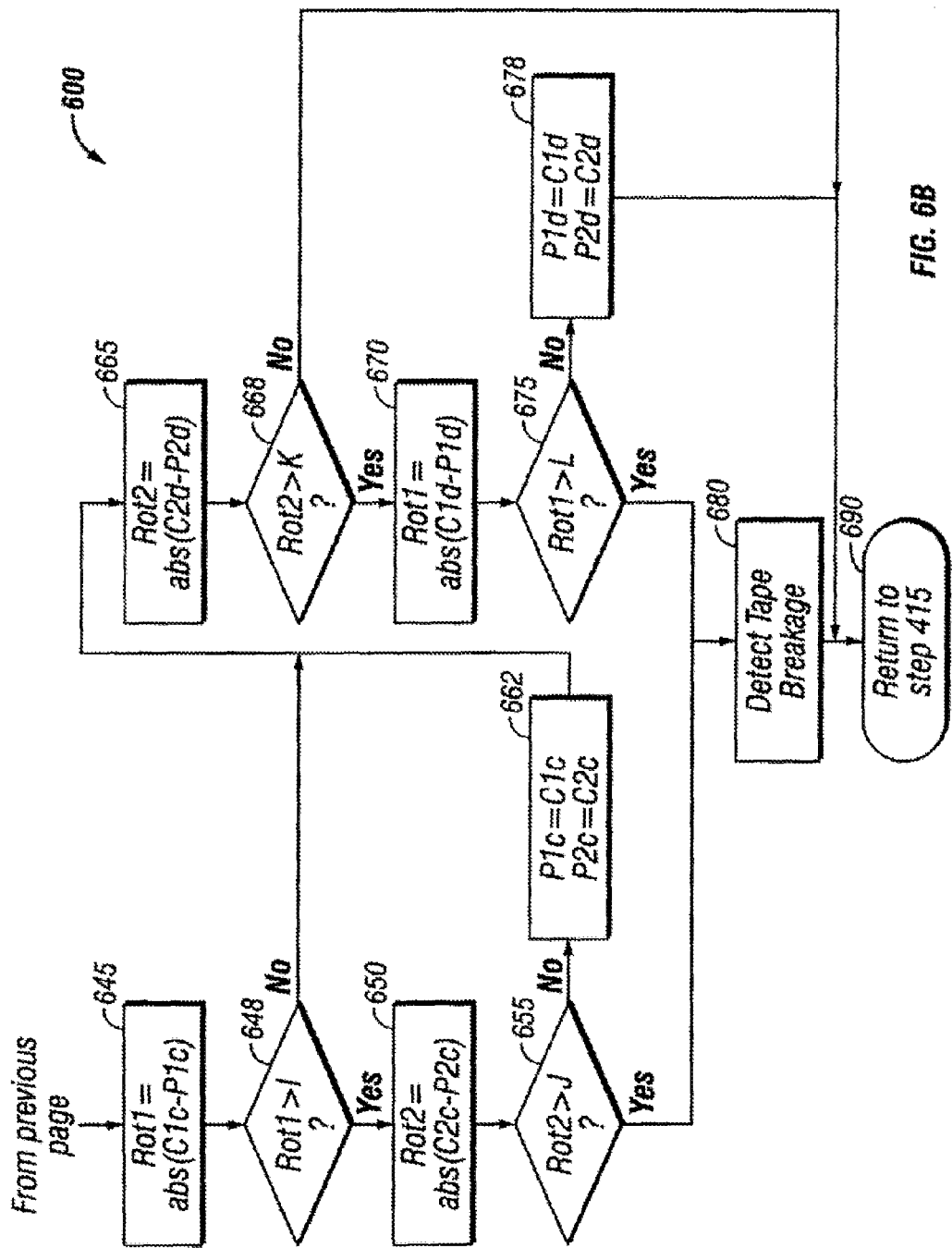

COMPENSATION FOR TAPE BREAKAGE IN A TAPE DRIVE

CROSS REFERENCE TO RELATED APPLICATIONS

The present Application is a divisional application of parent Application Ser. No. 10/765,789, "Compensation for Tape Breakage in a Tape Drive," filed Jan. 26, 2004 now U.S. Pat. No. 7,175,122.

TECHNICAL FIELD

The present invention relates generally to the field of data tape transport devices and, in particular, to compensating for tape breakage to prevent damage to the tape transport device.

BACKGROUND OF THE INVENTION

Magnetic tape provides a means for physically storing data. As an archival medium, tape often comprises the only copy of the data. The tape is typically made as thin as practically possible to maximize the length of a tape stored on a tape reel, and thereby maximize the amount of data that can be stored on the tape contained in a single cartridge. A tape drive is used to store and retrieve data with respect to the magnetic tape. Thinner tapes are desired to maximize the amount of tape stored in a single cartridge; however, thinner tapes are also more prone to breakage as a result of mechanical stress or malfunctions of the tape drive. An example of a tape drive is the IBM TotalStorage Enterprise Tape Drive 3592 manufactured by IBM Corporation. Tape drives are typically used in combination with an automated data storage library. For example the IBM TotalStorage Enterprise Tape Library 3494 manufactured by IBM Corporation is an automated data storage library that may include one or more tape drives and data storage media for storing data with respect to the tape drives.

Tape drives frequently employ DC motors and feedback control systems with motor drivers for operating the DC motors, to produce well controlled motion parameters such as position, velocity, and tape tension. Such control systems are usually very complex, and the feedback control system may compensate for marginal components, hiding latent problems until a catastrophic failure occurs. Tape breakage may occur as a result of a catastrophic failure or as a result of prolonged continuous use. If tape breakage occurs and the tape reels don't immediately cease rotation, further damage to the magnetic tape and/or tape drive may result. For example, rotation of the tape reels after tape breakage may result in the magnetic tape unwinding inside the tape drive resulting in severe damage to the tape and possible contamination of the tape drive from magnetic tape particles emitted from the disintegrating tape.

Tape breakage sensing has been accomplished previously by optical sensing systems that monitor the tape position on the guiding roller. A deviation from the expected range of motion indicates tape failure. Other systems use tension sensors coupled to the tape reel drive system to monitor the tape tension between the two reels. These solutions require additional sensors and associated circuits that are expensive and add to the cost of the tape drive.

Another problem with detecting tape breakage is that the tape breakage detection system may be prevented from operating when the tape drive experiences a condition that results in communication problems internally between the drive software, the servo software and/or hardware components. A typical tape drive system is controlled by microcode running on central processing unit (CPU) and/or application specific integrated circuits (ASIC). Multiple microcode sections may be responsible for the detection of abnormal conditions, and these microcode sections may experience communication problems during an error condition. The drive error detection processes depend on the drive behavior and the microcode status during the time when the error occurs. The error detection system may be required to examine many microcode variables depending on the code status and drive behavior when the error occurs. This may take a considerable amount of time during which the tape is further damaged. During certain conditions the system may cease to change states resulting in a locked or freeze condition. This results in a fatal error, with a possible power on reset being the only method to bring the drive back to operation. Severe damage may occur to the tape and/or the drive during a freeze condition. A periodic timer may be used to interrupt the drive and prevent the lockup condition. The periodic timer is used to periodically examine the CPU to ensure that the CPU continues to service the tape transport control system that controls tape movement. If an error occurs then the periodic timer will signal the CPU to disable the tape reel drive motors to stop the tape motion. The periodic timer is not always effective because it is possible for a tape drive system malfunction to occur that is not detected by the tape transport control system operating within the CPU. For example, the tape may run out of control while the servo control system appears to be operating correctly. In this case the periodic timer is not effective because the CPU does not detect the malfunction. Therefore, there is a need to improve the detection and compensation for magnetic tape breakage in a tape drive.

SUMMARY OF THE INVENTION

It is an object of the present invention to provide for the detection and compensation of tape breakage in a tape drive. It is a further object of the present invention to prevent disablement of tape breakage detection and compensation as a result of unexpected tape drive operation conditions. A further object of the present invention is to sense tape breakage by use of sensors used to control the motors that drive the tape reels.

Disclosed are a system, a method, and an article of manufacture to provide for the detection and compensation of tape breakage in a tape drive. The invention operates by simultaneously monitoring the tape reel rotation direction and the ratio of rotation between the tape reels. For proper operation of the tape drive, the two reels will rotate in the same direction if the tape tension is maintained between reels within a specified range. The present invention detects the rotation direction of the supply reel and the take up reel. If the rotation direction is not the same for both reels, then tape breakage is indicated and the reel rotation ceases.

Tape breakage is also detected if the tape reel angular rotation ratio between the supply and take up reels is not within a specified tape reel ratio range. The tape reel angular rotation ratio is detected by simultaneously measuring the angular rotation of each tape reel in a specified time period and then calculating the ratio. The tape reel ratio range is calculated from the ratio of the reel radius of empty reel and the reel radius of a full reel. The present invention detects the tape reel angular rotation ratio and if tape reel angular rotation ratio is outside of the specified tape reel ratio range, tape breakage is indicated and reel rotation ceases.

System operation under abnormal or unexpected conditions is assured by providing an independent interrupt timer to trigger the detection and compensation system to operate. Hardware and software embodiments of the present invention are provided to further assure system operation under any condition.

The tape reel rotational direction and tape reel angular rotation ratio are sensed with a group of hall sensors located in the motors that drive each reel. Hall sensor output and hall sensor detection logic are already in use for tape transport control system operation in most tape drives and therefore are available for use with the present invention. No new sensors need to be added for the present invention to operate resulting in a cost effective, efficient solution to tape breakage problems in existing tape drives.

In a first embodiment, the tape drive is provided with software and circuitry that detects the rotation direction of the supply reel and the take up reel. If the rotation direction is not the same for both reels, then tape breakage is indicated and the reel rotation ceases. An independent interrupt timer is provided to trigger the detection and compensation system to operate under any condition including abnormal tape drive operation to assure robust operation.

In a second embodiment, the tape drive is provided with software and circuitry that detects the tape reel angular rotation ratio and if the tape reel angular rotation ratio is outside of the specified tape reel ratio range, tape breakage is indicated and reel rotation ceases. An independent interrupt timer is provided to trigger the detection and compensation system to operate to assure robust operation under any conditions.

In each of the above embodiments, hardware and/or software implementations are provided. A hardware only implementation is provided to remove the burden of the tape breakage and compensation operation from the CPU. This provides an independent component separate from the CPU to operate the present invention resulting in a quicker response to tape breakage. The hardware only embodiment also reduces the resources required from the CPU for tape transport control.

For a more detailed understanding of the present invention, reference may be made to the following detailed description taken in conjunction with the accompanying drawings.

BRIEF DESCRIPTION OF THE DRAWINGS

FIG. 6A and 6B shows a flowchart of steps to detect the tape reel angular rotation.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
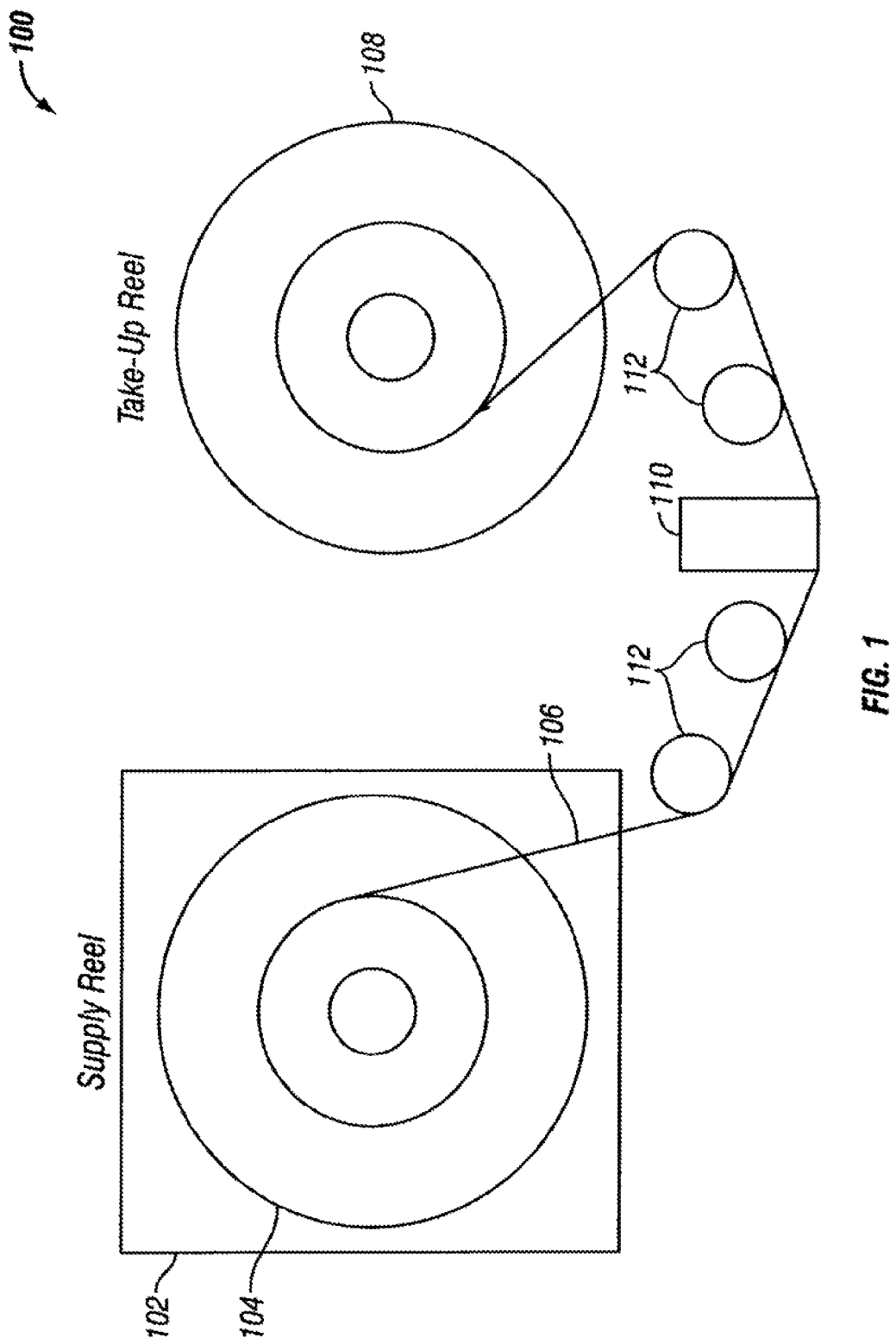
FIG. 1 is a diagram illustrating the tape path in a tape transport system.

FIG. 1 is a diagram illustrating the tape path of an exemplary tape transport system 100. The tape transport system 100 illustrated in FIG. 1 accepts a tape cartridge 102 containing first tape reel 104 on which is wound a length of tape 106. The tape transport system 100 includes a second tape reel 108, at least one tape head 110 and guide rollers 112. When the cartridge 102 is inserted into the tape transport system 100, the tape 106 is automatically threaded around the rollers 112, across the tape head 110 and onto the second tape reel 108. Motors (not shown) operatively coupled to the reels 104 and 108 pull the tape 106 across the tape head 110 which reads/writes information to/from the tape in a known manner. The motors may also move the tape 106 from one reel to another at high speed in fast forward and rewind operations. The motors may be directly coupled to first tape reel, 104 and second tape reel, 108 or there may be a mechanical drive system between the reels and the motor(s). Whether directly coupled or coupled through a mechanical drive system, the type of coupling determines a mechanical relationship between the motor(s) and the tape reels. The mechanical drive system could be for example, gears, belts, pulleys, clutches, etc. All tape operations may occur with the tape 106 moving in either direction. Thus, either first tape reel 104 or 108 may serve as the supply reel or the take-up reel, depending upon the direction of the tape 106. In FIG. 1, the first tape reel 104 within the cartridge 102 is shown serving as the tape supply reel while the second tape reel 108 is shown serving as the take-up reel. In this disclosure, the term "supply reel" refers to the reel operating as the supply reel at the present time and the term "take-up reel" refers to the reel operating as the take-up reel at the present time. Moreover, the terms "supply motor" and "take-up motor" refer to the motors operatively coupled to the supply and take-up reels, respectively. The type of tape transport system 100 shown in FIG. 1 is for illustrative purposes only and the invention may be employed with other types of transport systems.

Figure 2:
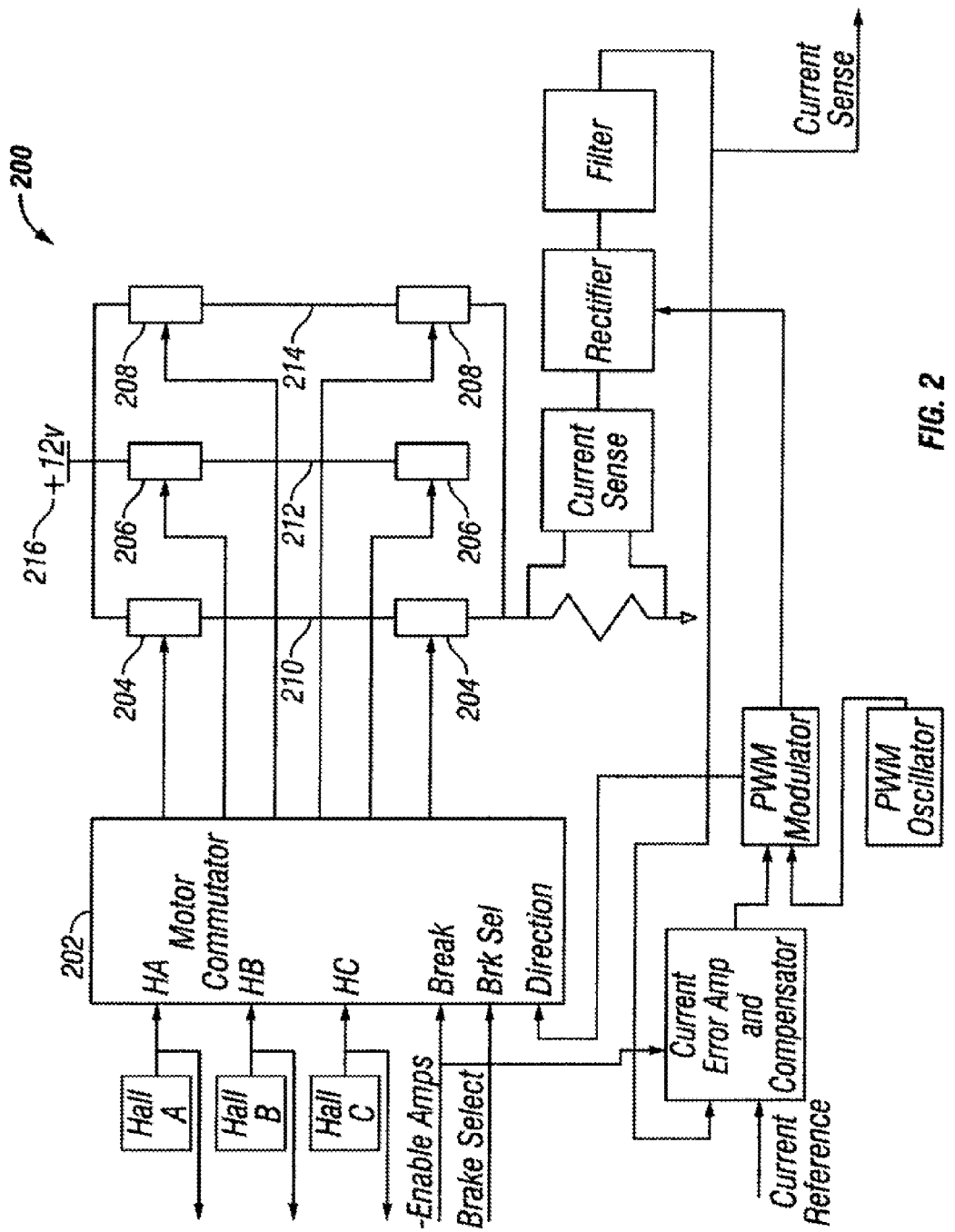
FIG. 2 is a block diagram of a brushless DC motor control circuit.

FIG. 2 is a block diagram of a motor control or driver circuit 200 for brushless DC motors coupled to the reels 104 and 108. A commutator 202 provides gate control for a set of power switches, such as FET switches 204, 206 and 208, which, in turn, connect/disconnect the motor windings 210, 212 and 214 to/from a motor power supply 216.

Figure 3:
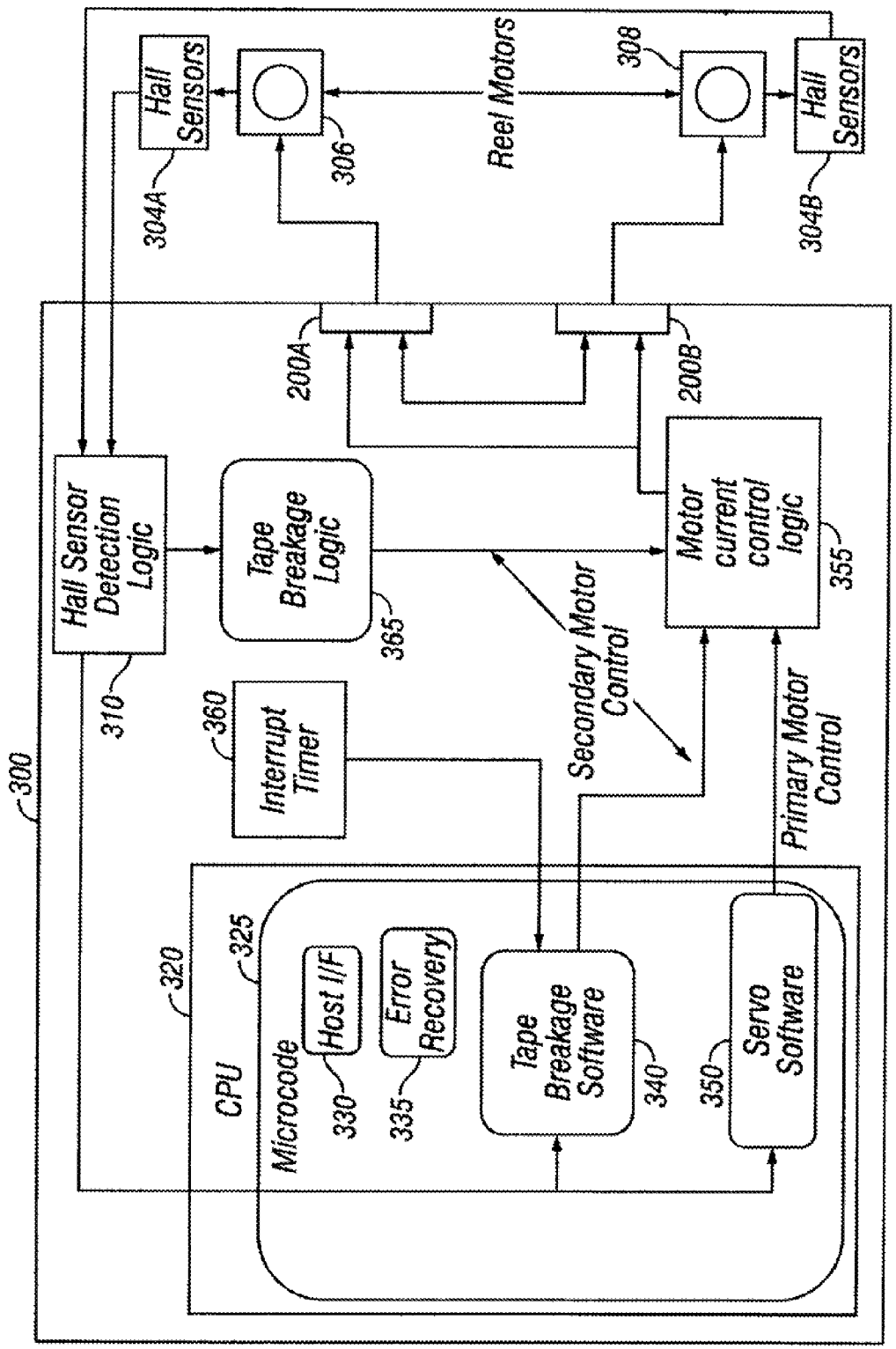
FIG. 3 is a block diagram of a tape system of the present invention.

FIG. 3 is a block diagram of a portion of the tape system 300 in which the tape breakage compensation system of the present invention is incorporated. Motor driver circuits 200A and 200B are coupled to the two reel motors 306 and 308, respectively. Reel motors 306 and 308, drive first tape reel 104 and second tape reel 108 respectively. Hall sensors 304A and 304B are coupled to the two reel motors 306 and 308, respectively. The output from hall sensors 304A and 304B are coupled to hall sensor detection logic 310. During normal servo operation hall sensor detection logic 310 decodes the output signals from hall sensors 304A and 304B to provide motor rotation information for servo software 350. Hall sensor detection logic 310 may be implemented for example by software, firmware, hardware circuits, a CPU, ASIC, etc., or a combination thereof. Servo software 350 processes the output from hall sensor detection logic 310 using control system laws to produce primary motor control signals that are transferred through motor current control logic 355 and delivered to motor driver circuits 200A and 200B. A description of the operation of servo control system for the two reel motors 306 and 308 is given in application Ser. No. 10/223,967 entitled "Direction detection and count method for three channel commutation sensor, filed on Aug. 8, 2002, by the assignee of the present invention, of which is hereby incorporated by reference in its entirety. Servo software 350 operates within the microcode section 325 of CPU 320. Other software components, including, host interface 330 and error recovery 335 also operate within the microcode section 325 of CPU 320. Host interface 330 provides communication between external hosts and CPU 320. Error recovery 335 provides software procedures to enable CPU 320 to direct operations to recover from errors that may occur during operation of the tape drive.

Additional control components for the present invention comprising motor control logic 355, interrupt timer 360, tape breakage logic 365 and tape breakage software 340 are shown in FIG. 3. The present invention can operate by use of a processing apparatus, for example, direct hardware control using tape breakage logic 365, software control using tape breakage software 340 operating on CPU 320, an alternative digital processing apparatus, ASIC, dedicated logic circuitry, etc., or a combination thereof. The following description of operation may be implemented on any processing apparatus know in the art, for example, tape breakage logic 365, software control using tape breakage software 340, or an alternative processing apparatus. During normal operation motor control logic 355 directs primary motor control signals from servo software 350 to motor driver circuits 200A and 200B. If tape breakage is detected then motor control logic 355 directs secondary motor control signals from tape breakage software 340 and/or tape breakage logic 365 to motor driver circuits 200A and 200B, resulting in stopping the rotation of both tape reels.

Figure 4:
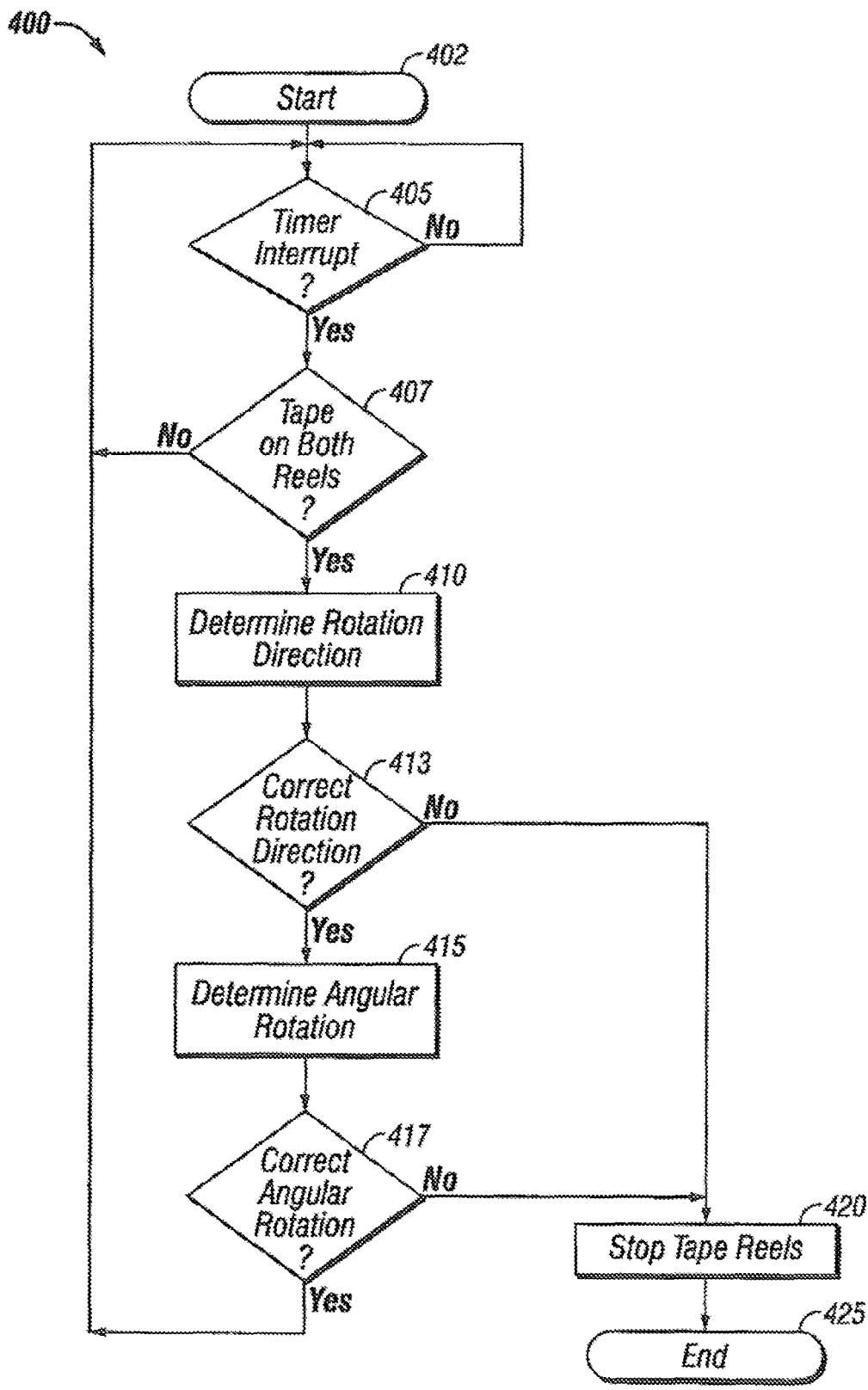
FIG. 4 shows a flowchart of steps to implement the present invention.

FIG. 4 contains flowchart 400 detailing the operation of the system to implement the present invention for compensating for tape breakage. At step 405, the system is waiting for an interrupt to begin the process. When a timer interrupt occurs a periodic interrupt signal is generated the causes control to flow to step 407 to determine if there is tape on both reels. In a preferred embodiment the periodic interrupt signal is generated by interrupt timer 360 and received by Tape breakage software 340 and/or tape breakage hardware 365. The period of the periodic interrupt signal may vary from nanoseconds to many minutes or more depending upon the operation conditions. Step 407 is accomplished for example, by examining the contents of a memory location that contains tape cartridge status information. Alternative means to detect if there is tape on both reels may also be used without limitation. If there isn't tape on both reels then control returns to step 405 and the system waits for the next interrupt. If there is tape on both reels then step 407 transfers control to step 410. At step 410 the rotation direction of both tape reels is determined. The details of the steps to accomplish step 410 are shown in flowchart 500 (discussed below). The results of step 410 are used at step 413 to determine if the rotation direction of the tape reels is the correct direction. If the rotation direction is not correct then step 413 transfers control to step 420. At step 420 the rotation is stopped for both tape reels. If the rotation direction is correct then control is transfer from step 413 to step 415. At step 415 the angular rotation is determined. The details of the steps to accomplish step 415 are shown in flowchart 600 (discussed below). If the angular rotation is not correct then step 417 transfers control to step 420. At step 420 the rotation is stopped for both tape reels. If the rotation direction is correct then control is transferred from step 417 to step 405 to wait for another interrupt to start the process over. If step 420 is executed as a result of either step 413 or step 417, then both tape reels cease rotation and the process ends at step 425.

Figure 5:
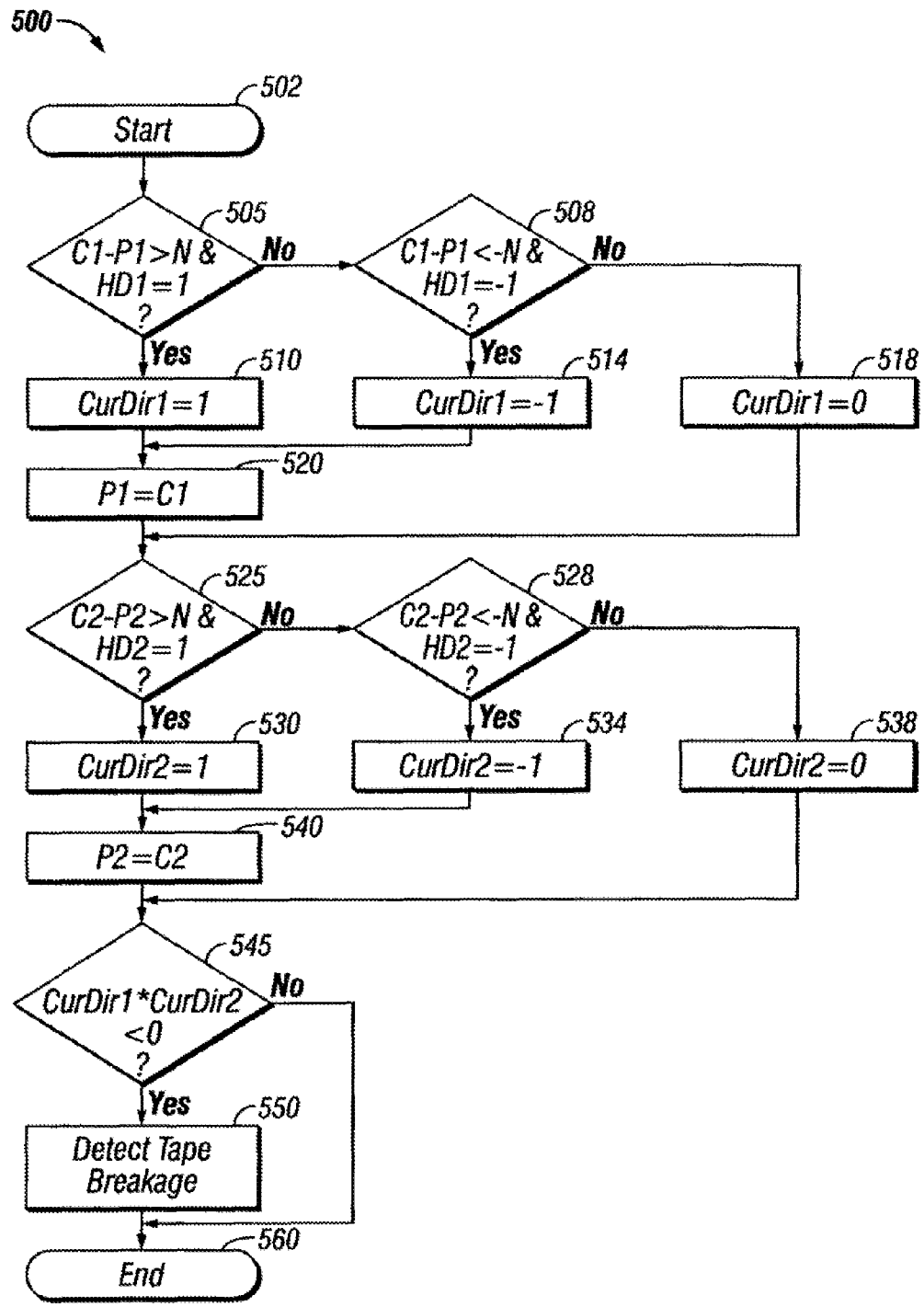
FIG. 5 shows a flowchart of steps to detect the tape reel rotation direction.

FIG. 5 contains flowchart 500 detailing the steps necessary to accomplish step 410 where the rotation direction is determined. Referring now to FIG. 3, flowchart 500 is executed by tape breakage software 340 and/or tape breakage logic 365 or other processing elements within the tape drive. The state of rotation of first tape reel 104 and second tape reel 108 is determined by processing hall sensor information from the hall sensor detection logic 310. Hall sensor detection logic 310 provides first hall direction signal, HD1, for first tape reel 104 and second hall direction signal, HD2, for second tape reel 108 by processing outputs from hall sensors 304A and 304B. Hall sensor detection logic 310 also provides current hall count signal, C1, for first tape reel 104 and current hall count signal, C2, for second tape reel 108. Hall count is used herein to describe the value of a counter that increments each time a signal from a hall sensor is received by hall sensor detection logic 310 for a forward direction of angular rotation of a tape reel and decrements each time an output from a hall sensor is received by hall sensor detection logic 310 for a reverse direction of angular rotation of a tape reel. The signal from a hall sensor is received by hall sensor detection logic 310 when a hall sensor generates an output that corresponds to a change in angular rotation. Table 1 lists the signals and the logical outcome of processing the signals expected after executing the steps of flowchart 500. The first column of Table 1 contains the row number for discussion purposes. The values in Table 1 can be applied to the signals for either first tape reel 104 or second tape reel 108. The second column contains first current hall count signal, C1, for first tape reel 104 or second current hall count signal, C2, for second tape reel 108. The values shown in the second column of Table 1 are dependent upon an algebraic combination of hall count variable, M and rotation threshold, N. Hall count variable, M, may assume any value that may be obtained from the outputs of hall sensor detection logic 310. The third column contains first previous hall count, P1, for first tape reel 104 or second previous hall count, P2, for second tape reel 108. First previous hall count, P1, and second previous hall count, P2, represent the hall count for the previous execution of the steps of flowchart 500. The values for P1 and P2 are determined by the execution of specific steps of flowchart 500 (explained below). The fourth column contains the equations in use for the present invention to compare logical conditions to rotation threshold, N. The fifth column contains first hall direction signal, HD1, for first tape reel 104 or second hall direction signal, HD2, for second tape reel 108. The values for HD1 and HD2 are obtained from hall sensor detection logic 310. The sixth column contains the first current direction signal, CurDir1, for first tape reel 104 or second current direction signal, CurDir2, for second tape reel 108 that are obtained as a logical result of the execution of the steps of flowchart 500. The rotation direction for first tape reel 104 is represented by first current direction, CurDir1, and the rotation direction for second tape reel 108 is represented by second current direction, CurDir2.

Referring back to FIG. 5, at step 505, first previous hall count, P1, for first tape reel 104 is subtracted from first current hall count, C1, for first tape reel 104, and then this difference is compared to rotation threshold, N. If C1−P1>N and first hall direction signal, HD1 is=1 then step 510 is executed, otherwise step 508 is executed. Step 510 sets first current direction signal, CurDir1, for first tape reel 104 equal to 1 (CurDir1=1), indicating that first tape reel 104 is rotating in a clockwise direction. Rows 12 and 13 of Table 1 correspond to the execution of step 510. Rotation threshold, N, is a user defined variable representing the number of hall counts that must occur before a determination of the tape reel direction is made. Rotation threshold, N, can be any number greater than zero and is determined by the ratio of period of the timer interrupt and the period of reel rotation. For example, if the interrupt period is 800 microseconds and the period of reel rotation is 4000 microseconds, then rotation threshold, N, may be set to be greater than 5 to ensure that at least one complete reel rotation has occurred before the direction is determined. Because the reel rotation speed varies during the operation of the tape drive, rotation threshold, N, may be set dynamically depending on the state of operation of the tape drive.

At step 508, the first previous hall count, P1, for first tape reel 104 is subtracted from the first current hall count, C1, for first tape reel 104, and then this difference is compared to rotation threshold, N. If C1−P1<−N and first hall direction signal, HD1 is=−1 then step 514 is executed, otherwise step 518 is executed. Step 514 sets first current direction signal, CurDir1, for first tape reel 104, equal to −1 (CurDir1=−1) indicating that first tape reel 104 is rotating in a counterclockwise direction. Rows 1 and 2 of Table 1 correspond to the execution of step 514. Step 518 sets first current direction signal, CurDir1, for first tape reel 104 equal to 0 (CurDir1=0) indicating that first tape reel 104 is not rotating. Rows 3-11, of Table 1 corresponds to the execution of step 518. The execution of either step 510 or 514 results in the execution of step 520. Step 520 sets first previous hall count, P1, for first tape reel 104 equal to first current hall count, C1, for first tape reel 104 so that the next time steps 505 and 508 are executed the reel rotation that has occurred since the last timer interrupt will be determined. After execution of step 518 or 520, step 525 is executed.

Alternatively first current direction signal, CurDir1, could be set equal to 0 (CurDir1=0) before execution of step 505. This would accomplish the same result because execution of step 505 or 508 would reset first current direction signal, CurDir1, to either 1 or −1, and not executing steps 505 or 508 would leave first current direction signal, CurDir1 equal to 0 (CurDir1=0). In this case a "NO" result from step 508 would transfer control directly to step 525.

The first time the steps of flowchart 500 are executed after a new cartridge is inserted into the tape drive the previous hall counts, P1, P2 will be equal to zero. If first current hall count, C1, is equal to hall count variable, M, then step 520 results in P1=M. At the next timer interrupt, the previous hall count, P1, will be equal to hall count variable, M, as shown in the third column of Table 1. For this next execution, first current hall count, C1, may be equal to any of the values shown in the second column of Table 1. Rows 1 and 13 of Table 1 indicate that the sequence of numbers for the rows continue without end. After execution of step 518 or 520, the rotation direction of second tape reel 108 is determined starting at step 525. Table 1 also applies to the signals for second tape reel 108.

At step 525, second previous hall count, P2, for second tape reel 108 is subtracted from second current hall count, C2, for second tape reel 108, and then this difference is compared to rotation threshold, N. If C2−P2>N and second hall direction signal, HD2 is=1, then step 530 is executed, otherwise step 528 is executed. Step 530 sets the second current direction signal, CurDir2, for second tape reel 108 equal to 1 (CurDir2=1) indicating that second tape reel 108 is rotating in a clockwise direction. Rows 12 and 13 of Table 1 correspond to the execution of step 530. Rotation threshold, N, operates as described above. At step 528, second previous hall count, P2, for second tape reel 108 is subtracted from second current hall count, C2, for second tape reel 108, and then this difference is compared to rotation threshold, N. If C2−P2<−N and hall direction signal, HD2 is=−1 then step 534 is executed, otherwise step 538 is executed. Step 534 sets second current direction signal, CurDir2, for second tape reel 108, equal to −1 (CurDir2=−1), indicating that second tape reel 108 is rotating in a counterclockwise direction. Rows 1 and 2 of Table 1 correspond to the execution of step 534. Step 528 sets second current direction signal, CurDir2, for second tape reel 108, equal to 0 (CurDir2=0), indicating that second tape reel 108 is not rotating. Rows 3-11 of Table 1 corresponds to the execution of step 538. The execution of either step 530 or 534 results in the execution of step 540. Step 540 sets second previous hall count, P2, for second tape reel 108 equal to second current hall count, C2, for second tape reel 108.

Alternatively second current direction signal, CurDir2, could be set equal to 0 (CurDir2=0) before execution of step 525. This would accomplish the same result because execution of step 525 or 528 would reset second current direction signal, CurDir2, to either 1 or −1, and not executing steps 525 or 528 would leave second current direction signal, CurDir2 equal to 0 (CurDir2=0). In this case a "NO" result from step 528 would transfer control directly to step 545.

After execution of step 538 or 540, step 545 is executed. At step 545, the first current direction, CurDir1, for first tape reel 104 and the second current direction, CurDir2, for second tape reel 108 are multiplied together and compared to zero. If at step 545, CurDir1*CurDir2<0 then step 550 is executed indicating that tape breakage has occurred. When CurDir1*CurDir2<0 the directions of first tape reel 104 and second tape reel 108 are different indicating that the tape has failed. Step 560 is executed, and control returns to step 413 of flowchart 400, with a result that tape breakage has occurred. If at step 545, CurDir1*CurDir2 is not less than 0 then step 560 is executed, and control returns to step 413 of flowchart 400 with the result that tape breakage has not occurred.

TABLE 1

| Row Number | Current Hall Count (C1 or C2) | Previous Hall Count (P1 or P2) | Rotation Threshold (N) | Hall Direction (HD1 or HD2) | Current Direction (CurDir1 or CurDir2) |
|---|---|---|---|---|---|
| 1 | ... | M | Cur-Prv <− N | −1 | −1 |
| 2 | M − N − 1 | M | Cur-Prv <− N | −1 | −1 |
| 3 | M − N | M | Cur-Prv =− N | −1 | 0 |
| 4 | M − 3 | M | Cur-Prv >− N | −1 | 0 |
| 5 | M − 2 | M | Cur-Prv >− N | −1 | 0 |

TABLE 1-continued

| Row Number | Current Hall Count (C1 or C2) | Previous Hall Count (P1 or P2) | Rotation Threshold (N) | Hall Direction (HD1 or HD2) | Current Direction (CurDir1 or CurDir2) |
|---|---|---|---|---|---|
| 6 | M − 1 | M | Cur-Prv >− N | −1 | 0 |
| 7 | M | M | Cur-Prv = 0 | 0 | 0 |
| 8 | M + 1 | M | Cur-Prv < N | 1 | 0 |
| 9 | M + 2 | M | Cur-Prv < N | 1 | 0 |
| 10 | M + 3 | M | Cur-Prv < N | 1 | 0 |
| 11 | M + N | M | Cur-Prv = N | 1 | 0 |
| 12 | M + N + 1 | M | Cur-Prv > N | 1 | 1 |
| 13 | ... | M | Cur-Prv > N | 1 | 1 |

Figure 6A:
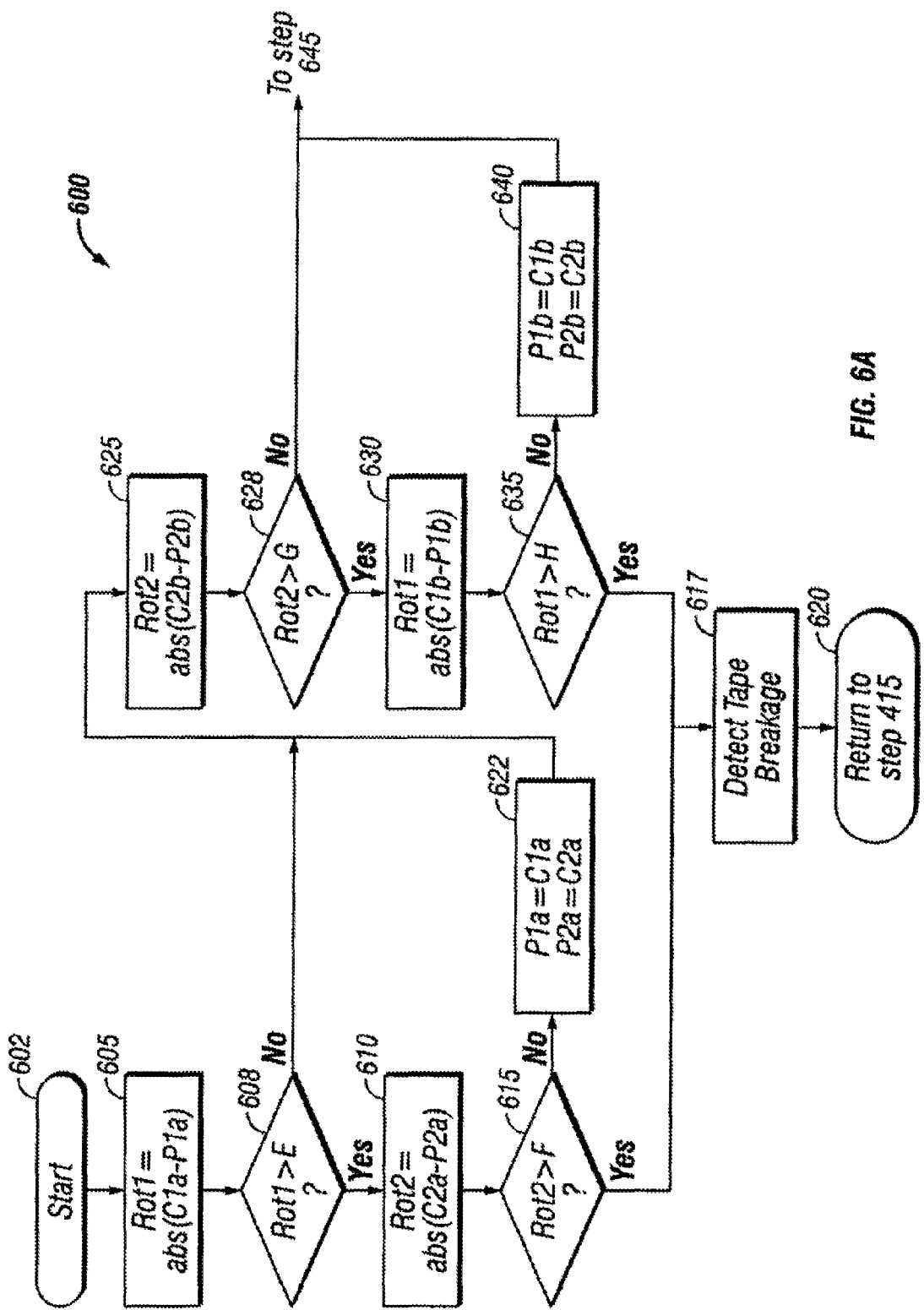

If the direction of rotation for first tape reel 104 and second tape reel 108 is different then the result of executing the steps of flowchart 500 is that both tape reels are stopped by the system. This is accomplished (see flowchart 500) by first determining the rotation direction of each tape reel. The rotation direction is represented by the variables first current direction, CurDir1, and second current direction, CurDir2, for first tape reel 104 and second tape reel 108 respectively. First current direction, CurDir1, and second current direction, CurDir2 are assigned values of −1 for counterclockwise rotation, +1 for clockwise rotation, and 0 for no rotation. First current direction, CurDir1, and second current direction, CurDir2 are multiplied together and if the product is less than zero then the tape reel rotation directions are different for the two tape reels. This indicates tape breakage and results in both tape reels ceasing rotation. If one of the tape reels is not rotating then the product of CurDir1 and CurDir2 will be zero. This could be the result of one tape reel rotating and the other not. This condition is detected by the method by flowchart 600 described below. Flowchart 600 shown in FIGS. 6A and 6B details the steps necessary to accomplish step 415 of flowchart 400. Steps 605 through step 635 detect tape breakage by determining if one reel is rotating more than the other reel with a consideration of the amount of tape that may exist on either reel. At step 605, first angular rotation, Rot1, for first tape reel 104 is calculated using, Rot1=(ABS(C1a−P1a)), where ABS is the absolute value function, C1a, is the current angular position of first tape reel 104 in hall counts, and P1a is the previous angular position of first tape reel 104 in hall counts. The resulting calculated first angular rotation, Rot1, is the angular rotation of first tape reel 104 that has occurred since the last execution of step 605. At step 608, first angular rotation, Rot1, is compared to a threshold hall count, E, to determine if first tape reel 104 has rotated more than threshold hall count, E. Threshold hall count, E is user defined and may be set for example to be equal to one complete rotation of first tape reel 104. Threshold hall count, E, provides a means to ensure that there has been significant rotation of first tape reel 104 before proceeding to determine the rotation of second tape reel 108. If first angular rotation, Rot1, is greater than threshold hall count, E, then control transfers to step 610, otherwise control transfers to step 625. At step 610, second angular rotation, Rot2, for second tape reel 108 is calculated using, Rot2=(ABS(C2a−P2a)), where C2a, is the current angular position of second tape reel 108 in hall counts, and P2a is the previous angular position of second tape reel 108 in hall counts. The resulting calculated second angular rotation, Rot2, is the angular rotation of second tape reel 108 that has occurred since the last execution of step 610. At step 615, second angular rotation, Rot2, is compared to a threshold hall count, F, to determine if second tape reel 108 has rotated more than threshold hall count, F. Threshold hall count, F, is user defined and may be calculated based on the ratio of a full tape reel to an empty tape reel radius.

Figure 7:
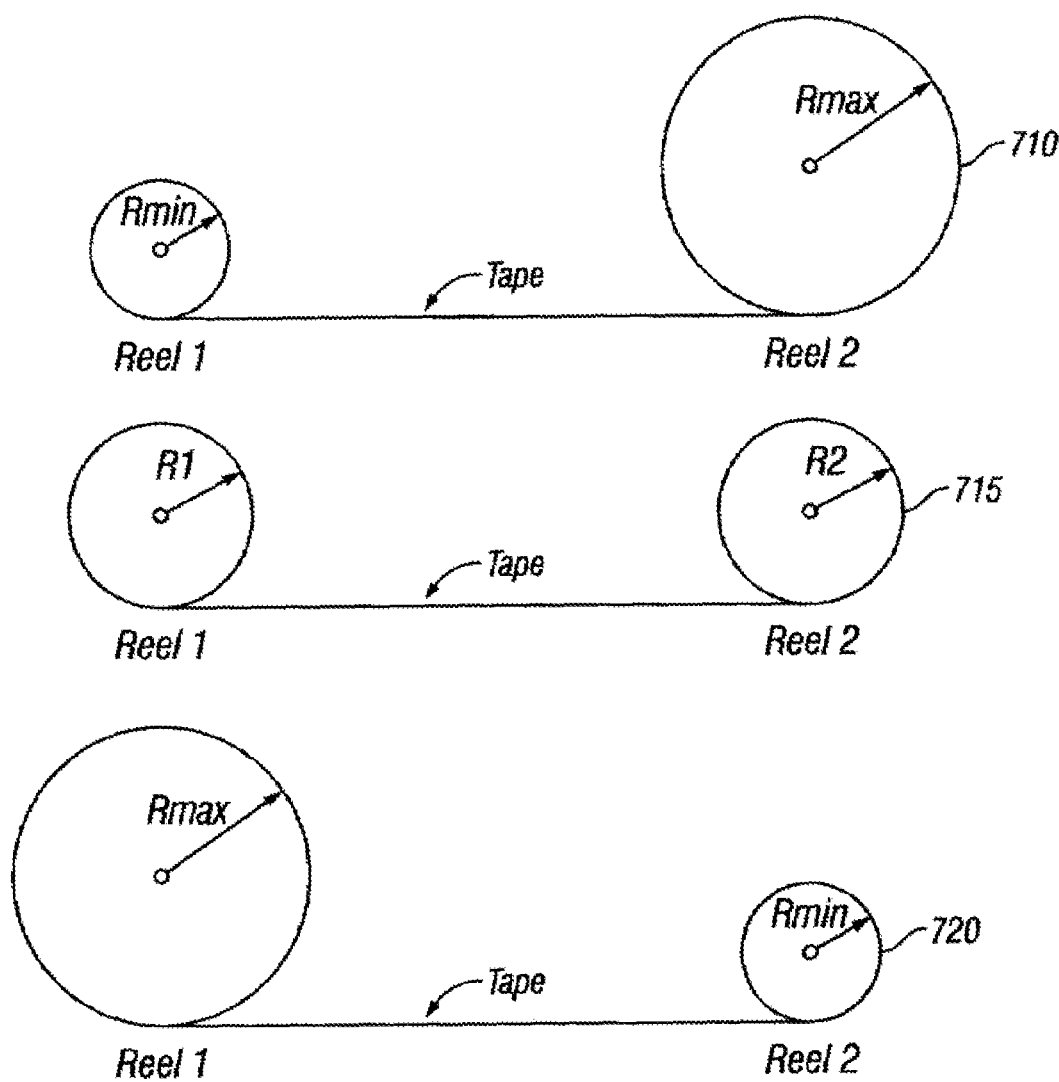
FIG. 7 is an illustration of conditions of magnetic tape on the tape reels during tape transport operation.

FIG. 7 shows three conditions used herein to illustrate the method used to determine threshold hall count, F, for one embodiment of the present invention. When a cartridge is first loaded into a tape drive the supply tape reel (reel 2 for this example) will be full and the take up reel (reel 1) will be empty as shown in the condition labeled as 710 of FIG. 7. During tape drive operation the magnetic tape is transferred from reel 2 to reel 1 as shown in the condition labeled as 715 of FIG. 7. Eventually all of the tape is transferred from the supply reel (reel 2) to the take up reel (reel 1) as shown in the condition labeled 720 of FIG. 7. When either tape reel is empty there will be a minimum radius, Rmin, of the tape reel and when the either tape reel is full there will me a maximum radius, Rmax of the tape reel. Defining the reel ratio range, Rr, as: Rmin/Rmax<Rr<Rmax/Rmin, results in an upper limit for the reel ratio range of Rmax/Rmin and a lower limit of Rmin/Rmax. Tape breakage can be detected if Rot2/Rot1 exceeds reel ratio range, Rr. Threshold hall count, F is calculated using, F=Max(Rr)*E, where Max is the maximum value function. For example if the full reel has twice the radius of an empty reel then reel ratio range, Rr, is: ½<Rr<2. If there are 24 hall counts for one rotation of the tape reel, then E=24 for a threshold of one complete rotation of first tape reel 104. Threshold hall count, F, may be calculated as F=Max (1/2 ,2)*24=48 hall counts. If second angular rotation, Rot2, at step 615 is greater than threshold hall count, F (F=48 for this example), then the tape has failed and step 617 is executed. After step 617, step 620 is executed resulting in returning to step 415 of flowchart 400 with a condition reported as tape breakage and angular rotation out of range. At step 417, the "NO" condition results in the execution of step 420 where both tape reels are stopped.

If the result of step 615 is that second angular rotation, Rot2, is not greater than threshold hall count, F, then step 622 is executed. At step 622, the value of previous angular position, P1a, is set equal to the value of current angular position, C1a, for first tape reel 104, and the value of previous angular position, P2a, is set equal to the value of current angular position. C2a, of second tape reel 108, so that the next time steps 605 and 610 are executed the reel rotations will be calculated based on the reel rotation status at the last "no" result of step 615.

Step 625 is executed as a result of either a "no" result from step 608 or after the execution of step 622. Steps 625 through step 640 are similar in operation to the execution of steps 605 through 622, except the order of determining reel rotations is reversed.

At step 625, second angular rotation, Rot2, is calculated using, Rot2=(ABS(C2*b*–P2*b*)), where C2*b*, is the current angular position of second tape reel 108 in hall counts, and P2*b* is the previous angular position of second tape reel 108 in hall counts. The resulting calculated second angular rotation, Rot2, is the angular rotation of second tape reel 108 that has occurred since the last execution of step 625. At step 628, second angular rotation, Rot2, is compared to a threshold hall count, G, to determine if second tape reel 108 has rotated more than threshold hall count, G. Threshold hall count, G, is user defined and is determined in the same manner as threshold hall count, E, discussed above. Threshold hall count, G, provides a means to ensure that there has been significant rotation of second tape reel 108 before proceeding to determine the rotation of first tape reel 104. If second angular rotation, Rot2, is greater than threshold hall count, G, then control transfers to step 630, otherwise control transfers to step 645. At step 630, first angular rotation, Rot1, is calculated using, Rot1=(ABS(C1*b*-P1*b*)), where C1*b*, is the current angular position of first tape reel 104 in hall counts, and P1*b* is the previous angular position of first tape reel 104 in hall counts. The resulting calculated first angular rotation, Rot1, is the angular rotation of first tape reel 104 that has occurred since the last execution of step 625. At step 635, reel 1 angular rotation, Rot1, is compared to a threshold hall count, H, to determine if second tape reel 108 has rotated more than threshold hall count, H. Threshold hall count, H is user defined and may be calculated in the manner described above for threshold hall count F, and is similarly based on the ratio of a full tape reel to an empty tape reel radius. The reel ratio range Rr, described above applies to threshold hall count, F. Threshold hall count, H, may be calculated using, H=Max(Rr)*G. If first angular rotation, Rot1, at step 635 is greater than threshold hall count, H, then the tape has failed and step 617 is executed. After step 617, step 620 is executed resulting in returning to step 415 of flowchart 400 with a condition reported as tape breakage and angular rotation out of range. At step 417, the "NO" condition results in the execution of step 420 where both tape reels are stopped.

If the result of step 635 is that first angular rotation, Rot1, is not greater than threshold hall count, H, then step 640 is executed. At step 640, the value of previous angular position, P1*b*, is set equal to the value of current angular position, C1*b*, for first tape reel 104, and the value of previous angular position, P2*b*, is set equal to the value of current angular position, C2*b*, so that the next time steps 625 and 630 are executed the reel rotations will be calculated based on the reel rotation status at the last "no" result of step 635.

Step 645 is executed as a result of either a "no" result from step 628 or after the execution of step 640. Steps 645 through step 675 detect tape breakage by determining if one reel is rotating and the other reel has stopped. At step 645, first angular rotation, Rot1, is calculated using, Rot1=(ABS(C1*c*–P1*c*)), where C1*c*, is the current angular position of first tape reel 104 in hall counts, and P1*c* is the previous angular position of first tape reel 104 in hall counts. The resulting calculated first angular rotation, Rot1, is the angular rotation of first tape reel 104 that has occurred since the last execution of step 645. At step 648, first angular rotation, Rot1, is compared to a threshold hall count, I, to determine if first tape reel 104 has rotated more than threshold hall count, I. Threshold hall count, I, is user defined and is determined in the same manner as threshold hall count, E, discussed above. Threshold hall count, I, provides a means to ensure that there has been significant rotation of first tape reel 104 before proceeding to determine the rotation of second tape reel 108. Threshold hall count, I, may be set for example to be equal to two complete rotations of first tape reel 104. If first angular rotation, Rot1, is greater than threshold hall count, I, then control transfers to step 650, otherwise control transfers to step 665. At step 650, second angular rotation, Rot2, is calculated using, Rot2=(ABS(C2*c*–P2*c*)), where C2*c*, is the current angular position of second tape reel 108 in hall counts, and P2*c* is the previous angular position of second tape reel 108 in hall counts. The resulting calculated second angular rotation, Rot2, is the angular rotation of second tape reel 108 that has occurred since the last execution of step 650. At step 655, second angular rotation, Rot2, is compared to rotation threshold, J, to determine if second tape reel 108 has rotated less than rotation threshold, J. Rotation threshold, J, is calculated using for example: J=Min(Rr)*I, where Rr is the reel ratio range described above (Rmin/Rmax<Rr<Rmax/Rmin) and Min is the minimum function that extracts the minimum value of an expression. Tape breakage can be detected if Rot2/Rot1 is less than the minimum value for reel ratio range, Rr. For example if the full reel has twice the radius as an empty reel then the minimum reel ratio, Min(Rr)=1/2. If there are 24 hall counts for one rotation of the tape reel and I=48 (for a threshold of two rotations), then rotation threshold, J, is equal to 24 hall counts (J=24). For this example, if second angular rotation, Rot2, at step 655 is less than 24 then second tape reel 108 has not rotated enough and may be stopped. This indicates that the tape has failed and step 680 is executed. After step 680, step 690 is executed resulting in returning to step 415 of flowchart 400 with a condition reported as tape breakage and angular rotation out of range. At step 417, the "NO" condition results in the execution of step 420 where both tape reels are stopped.

If the result of step 655 is that second angular rotation, Rot2, is not less than rotation threshold, J, then step 662 is executed. At step 662, the value of previous angular position, P*c*, is set equal to the value of current angular position, C1*c*, of first tape reel 104, and the value of previous angular position, P2*c*, is set equal to the value of current angular position, C2*c*, of second tape reel 108 so that the next time steps 645 and 650 are executed the reel rotations will be calculated based on the reel rotation status at the last "no" result of step 655.

Step 665 is executed as a result of either a "no" result from step 648 or after the execution of step 662. Steps 665 through step 678 are similar in operation to the execution of steps 645 through 662, except the order of determining reel rotations is reversed.

At step 665, second angular rotation, Rot2, is calculated using, Rot2=(ABS(C2*d*–P2*d*)), where C2*d*, is the current angular position of second tape reel 108 in hall counts, and P2*d* is the previous angular position of second tape reel 108 in hall counts. The resulting calculated second angular rotation, Rot2, is the angular rotation of second tape reel 108 that has occurred since the last execution of step 665. At step 668, second angular rotation, Rot2, is compared to a threshold hall count, K, to determine if second tape reel 108 has rotated more than threshold hall count, K. Threshold hall count, K, provides a means to ensure that there has been significant rotation of second tape reel 108 before proceeding to determine the rotation of first tape reel 104. Threshold hall count, K, may be set for example to be equal to two complete rotations of first tape reel 104. If second angular rotation, Rot2, is greater than threshold hall count, K, then control transfers to step 670, otherwise control transfers to step 690. At step 690, control returns to step 415, with no tape breakage detected and angular rotation within operating range. At step 670 first angular rotation, Rot1, is calculated using, Rot1=(ABS(C1d−P1d)), where C1d, is the current angular position of first tape reel 104 in hall counts, and P1d is the previous angular position of first tape reel 104 in hall counts. The resulting calculated first angular rotation, Rot1, is the angular rotation of first tape reel 104 that has occurred since the last execution of step 670. At step 675, first angular rotation, Rot1, is compared to a rotation threshold, L, to determine if first tape reel 104 has rotated less than rotation threshold, L. Rotation threshold, L, is user defined and may be calculated in the manner described above for rotation threshold, J. The reel ratio range, Rr, described above applies to rotation threshold, L. If first angular rotation, Rot1, at step 675 is less than rotation threshold, L then first tape reel 104 has not rotated enough and may be stopped. This indicates that the tape has failed and step 680 is executed. After step 680, step 690 is executed resulting in returning to step 415 of flowchart 400 with a condition reported as tape breakage and angular rotation out of range. At step 417, the "NO" condition results in the execution of step 420 where both tape reels are stopped.

If the result of step 675 is that first angular rotation, Rot1, is not less than rotation threshold, L, then step 678 is executed. At step 678, the value of previous angular position, P1d is set equal to the value of current angular position, C1d, of first tape reel 104, and the value of previous angular position, P2d, is set equal to the value of current angular position, C2d, of second tape reel 108 so that the next time steps 665 and 670 are executed the reel rotations will be calculated based on the reel rotation status at the last "no" result of step 675.

If the angular rotation ratio of the two tape reels is out of the range of the reel ratio range, Rr, the method outlined in flowchart 600 will cause the system to stop the rotation of both tape reels. This is accomplished by (Flowchart 600) first determining a first angular rotation, Rot1, of a first tape reel, 104, and a second angular rotation, Rot2, of a second tape reel, 108. If the angular rotation ratio (Rot1/Rot2) is not within the reel ratio range, Rr, then tape breakage is indicated and both tape reels are caused to stop by the system. Four different evaluations are executed by the steps of flowchart 600 to determine if the angular rotation ratio is within the reel ratio range, Rr.

In the first evaluation, first angular rotation, Rot1, is examined to determine if it is greater than a threshold hall count to ensure that the rotation of first tape reel, 104 is large enough to proceed to examine the rotation of second tape reel, 108. If the rotation of first tape reel, 104 is large enough, then second angular rotation, Rot2 is examined to determine if it is greater than the maximum value of the threshold hall count multiplied by reel ratio range, Rr. If it is greater than the maximum value, then the reel ratio range, Rr, has been exceeded and both tape reels cease to rotate.

In the second evaluation, the first evaluation method is used, except the order of examining the tape reels is reversed.

In the third evaluation, first angular rotation, Rot1, is examined to determine if it is greater than a threshold hall count to ensure that the rotation of first tape reel, 104 is large enough to proceed to examine the rotation of second tape reel, 108. If the rotation of first tape reel, 104 is large enough, then second angular rotation, Rot2 is examined to determine if it is less than the minimum value of the threshold hall count multiplied by reel ratio range, Rr. If it is less than the minimum value, then reel ratio range, Rr, has been exceeded (on the smallest value) and both tape reels cease to rotate.

In the fourth evaluation, the second evaluation method is used, except the order of examining the tape reels is reversed.

The invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for compensating for tape breakage in a tape drive, comprising the steps of:
   a) determining a first angular rotation of a first tape reel and determining a second angular rotation of a second tape reel;
   b) calculating an angular rotation ratio equal to said first angular rotation divided by said second angular rotation;
   c) determining a reel ratio range based on a radius of said first tape reel and a radius of said second tape reel; and
   d) in response to determining that said angular rotation ratio is not within said reel ratio range, stopping the rotation of said first tape reel and said second tape reel.

2. The method of claim 1, wherein step (c) further comprises the steps of:
   a) calculating a tape minimum radius of an empty tape reel;
   b) calculating a tape maximum radius of a full tape reel; and
   c) calculating said reel ratio range wherein, tape minimum radius/tape maximum radius<reel ratio range<tape maximum radius/tape minimum radius.

3. The method of claim 1, wherein step (d) further comprises the steps of:
   a) in response to determining that said first angular rotation is greater than a threshold hall count and that said second angular rotation is greater than the maximum value of said threshold hall count multiplied by said reel ratio range, stopping the rotation of said first tape reel and said second tape reel; and b) in response to determining that said first angular rotation is greater than said threshold hall count and that said second angular rotation is less than the minimum value of said threshold hall count multiplied by said reel ratio range stopping the rotation of said first tape reel and said second tape reel.

4. The method of claim 1, wherein said first tape reel and said second tape reel are caused to rotate by a rotor and wherein step (a) further comprises the steps of:

a) sensing the position of said rotor with a group of sensors, said group of sensors having multiple states determined by the position of the rotor, and wherein, in each of said states, the group of sensors define an associated, respective numeric value;

b) at defined periods, identifying the current state of said group of sensors, and using said numeric value associated with said current state to determine an angular rotation of said rotor during said measurement time between said defined periods;

c) calculating said first angular rotation using said angular rotation of said rotor and a mechanical relationship between said rotor and said first tape reel; and d) calculating said second angular rotation using said angular rotation of said rotor and a mechanical relationship between said rotor and said second tape reel.

5. The method of claim 1, wherein said method steps are executed in response to a periodic interrupt signal.

* * * * *